May 31, 1966  R. GILLIS  3,253,397
SLOTTED OSCILLATORY FACE PLATES FOR CABLE STRANDERS
Filed Feb. 24, 1964  4 Sheets-Sheet 1

INVENTOR.
R. GILLIS
BY
*S. Gundersen*
ATTORNEY

United States Patent Office 3,253,397
Patented May 31, 1966

3,253,397
SLOTTED OSCILLATORY FACE PLATES FOR
CABLE STRANDERS
Randall Gillis, Saratoga, Calif., assignor to Western Electric Company Incorporated, New York, N.Y., a corporation of New York
Filed Feb. 24, 1964, Ser. No. 346,880
4 Claims. (Cl. 57—34)

This invention relates to a device for orienting conductors in a communication cable and particularly to a slotted oscillating face plate for continuously changing the position of selected conductors relative to each other and relative to other conductors along the length of a cable.

One of the problems experienced in the manufacture of communication cable is cross talk between conductors or conductor pairs in the cable. In order to reduce cross talk between conductors to an acceptable level in a communication cable, it has been the practice in the industry to twist pairs of conductors together. It has been found, however, that interference or cross talk results between adjacent twisted pairs in the cable having similar twist lengths. The solution to this problem is to provide the twisted conductors with different twist lengths so that even though adjacent pairs of conductors paralleled each other along the length of the cable, undesirable interference or cross talk is reduced to an acceptable level.

With the manufacture of cable requiring a greater number of conductor pairs, it has been found to be impractical to provide conductor pairs having sufficiently dissimilar twist lengths to reduce cross talk between such conductor pairs to an acceptable level. Further, with the increased quality requirements of communication cable, it has become necessary to provide facilities for varying the relative position of the twisted pairs along the length of the cable so as to reduce interference or cross talk to an acceptable level.

Reference is made to U.S. Patent 2,882,676 to Bryan et al. and assigned to Western Electric Company, Incorporated, which discloses a cable strander which utilizes oscillating face plates. Each face plate has two concentric rows of apertures through which twisted conductor pairs are passed. Although the relative position of each twisted pair will be constantly shifted in the cable as the face plates oscillate, twisted pairs passing through adjacent apertures in a given face plate will have the same relative position to each other along the entire length of the cable resulting in undesirable interference or cross talk.

It is, therefore, an object of this invention to provide a device for continuously changing the position of selected conductors relative to each other along the length of a communication cable so as to reduce interference or cross talk between such conductor pairs to an acceptable level.

With this and other objects in view, the present invention contemplates the use of an oscillatory face plate which is provided with concentric rows of apertures, alternate rows of such apertures being elongated to permit movement of conductors or conductor pairs therein as the face plate oscillates.

Other objects and advantages will be apparent from the following detailed description when considered in conjunction with the accompanying drawings, wherein.

Figure 1:
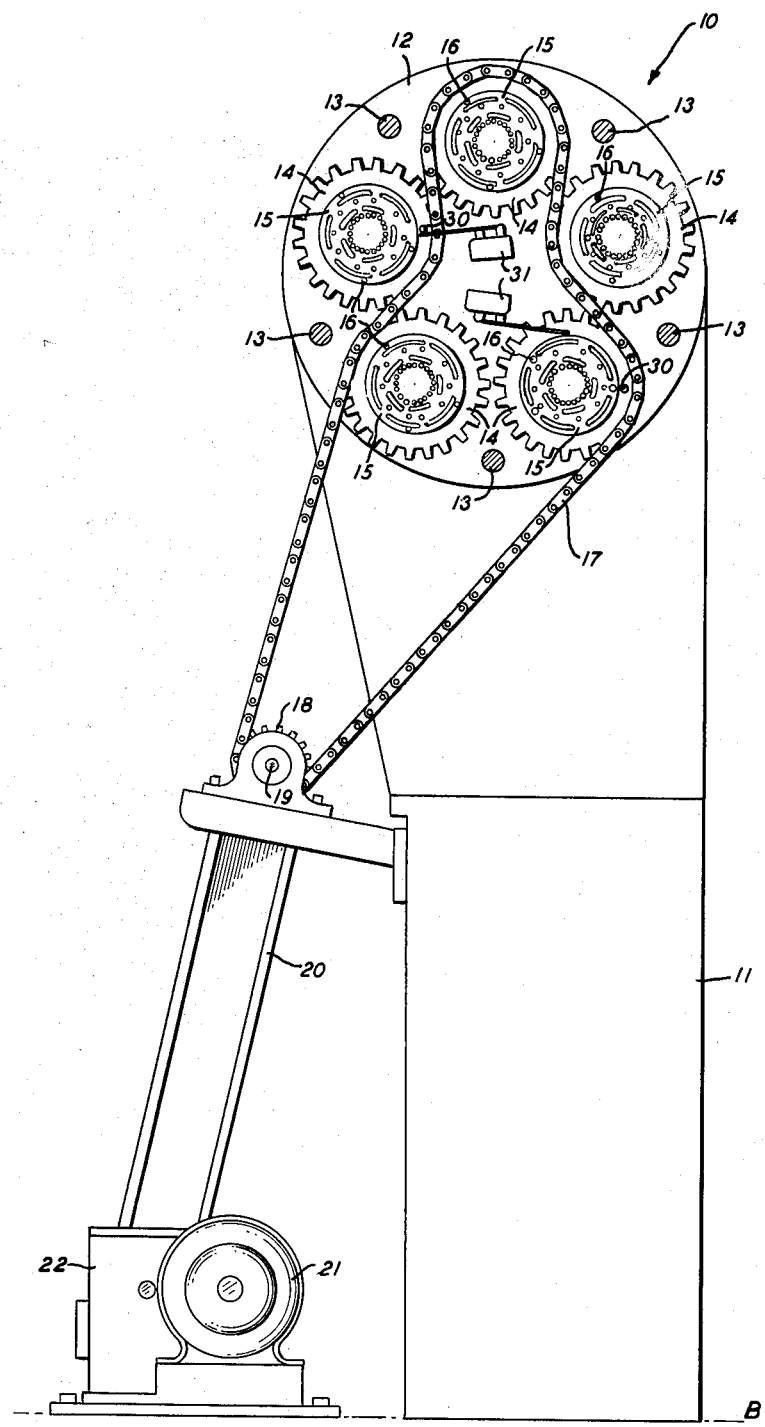
FIG. 1 is a front elevational view of a cable strander of the type which utilizes oscillating face plates.

Referring now to the drawings, a cable strander of the type which utilizes an oscillatory face plate is generally indicated by the numeral 10. The strander 10 is essentially the same strander as disclosed in Patent 2,882,676 except that face plates embodying the principles of the instant invention are substituted for the face plates disclosed in the cited patent.

The strander 10 is supported by the frame 11 and plate 12 is mounted to the frame 10 by a plurality of supporting rods 13. Sprockets 14 are mounted for rotation in suitable apertures in the plate 12 and may be so mounted by any conventional method. Face plates 15 are mounted to the sprockets 14 by pins 16 for rotation with the sprockets 14. Chain 17 engages each of the sprockets 14 as shown in FIG. 1 and also engages a sprocket 18. The sprocket 18 is mounted upon a shaft 19 which is driven by a conventional belt and pulley connection 20. The belt and pulley arrangement is in turn driven by electric motor 21 through a speed reducing drive 22 in a conventional manner.

Two of the sprockets 14 are provided with pins 30 which rotate with the sprockets and extend above the sprockets a predetermined distance. Limit switches 31 are located so as to be actuated by pins 30 as the sprockets 14 are rotated. The limit switches 31 are used to reverse the electric motor 21 when actuated by pins 30 in a conventional manner such as that disclosed in Patent 2,882,676. Depending on the relative position of the pins 30 on the sprockets 14, the sprockets 14 will be oscillated through a desired number of degrees and will in turn oscillate the face plates 15.

Figure 2:
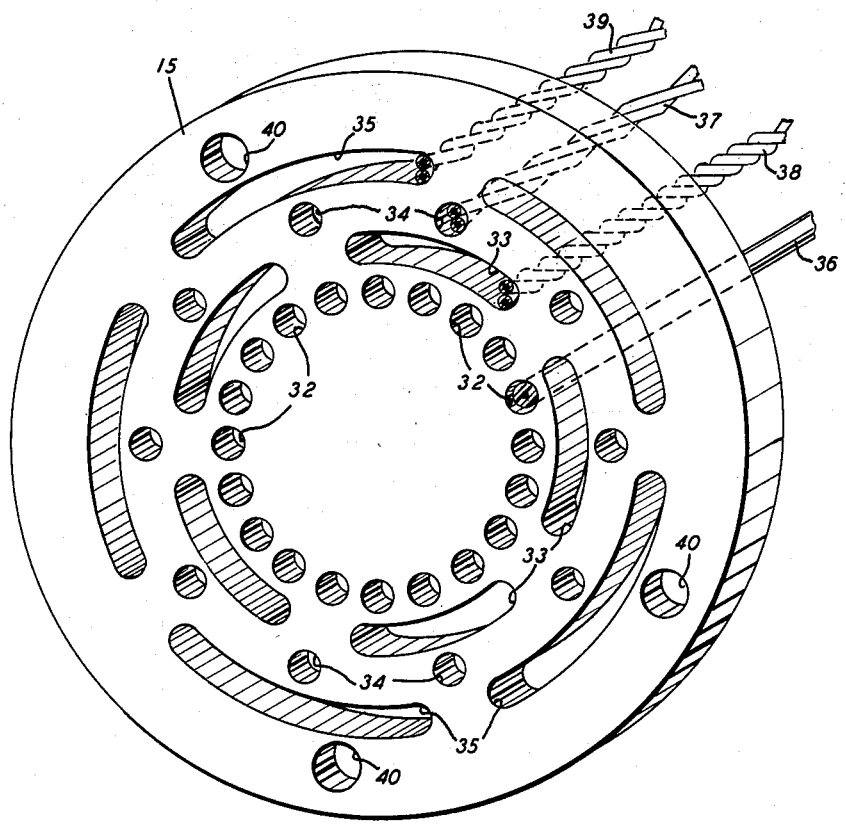
FIG. 2 is a perspective view of an oscillating face plate which embodies principles of the invention.
Figure 3:
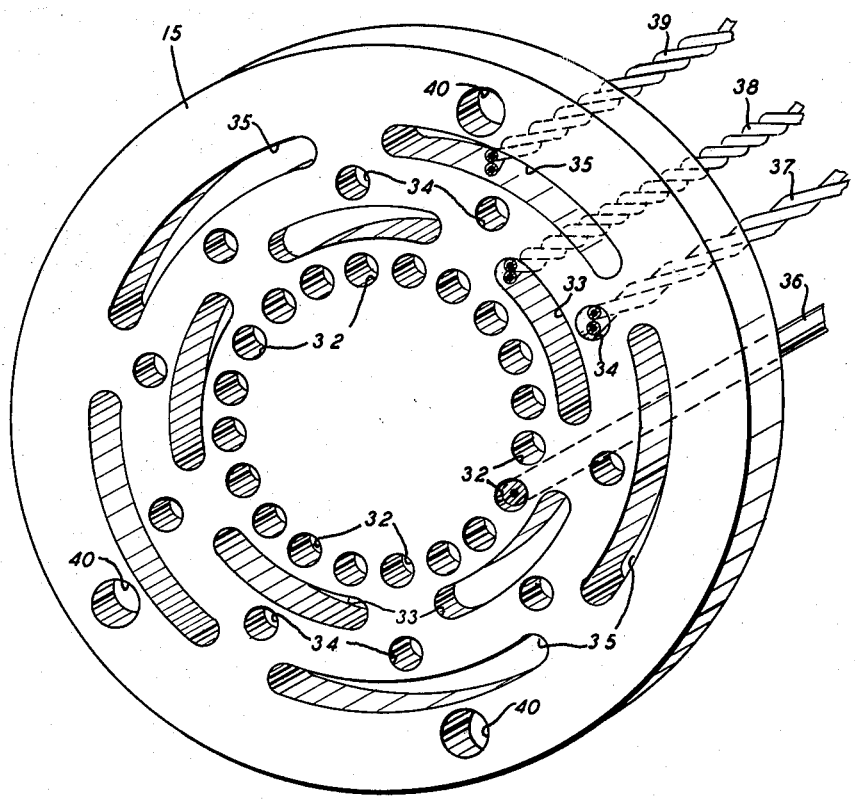
FIG. 3 is another view of FIG. 1 showing an operational sequence of the face plate.
Figure 4:
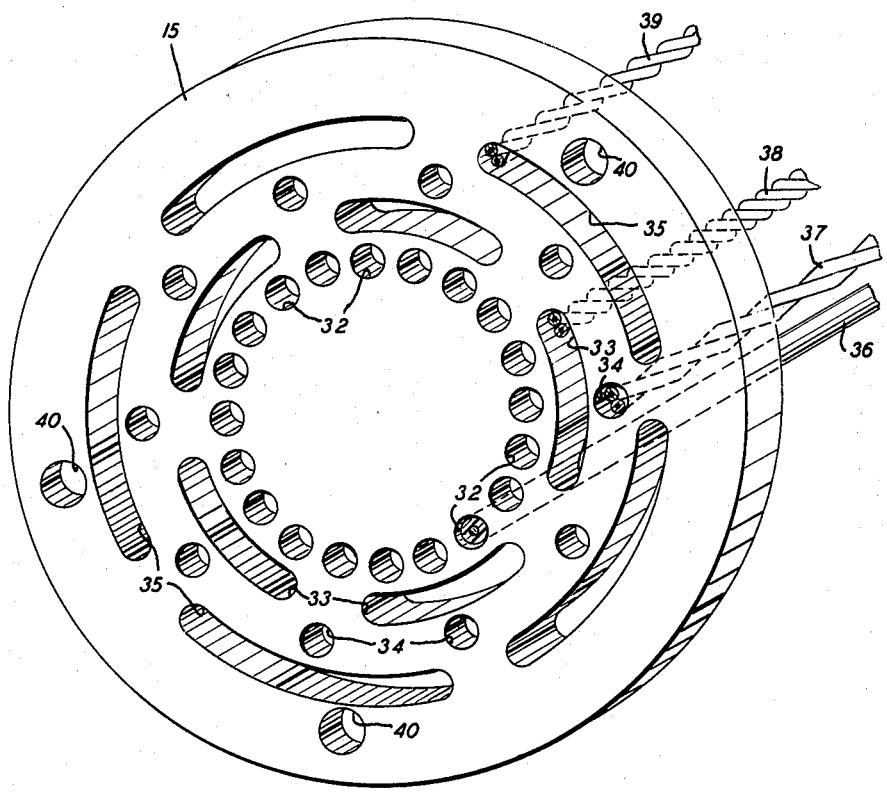
FIG. 4 is an additional view of FIG. 1 showing a further operational sequence of the face plate.

As shown in FIGS. 2, 3 and 4, the face plate 15 is provided with a plurality of concentric rows of apertures 32, 33, 34 and 35. Alternate rows of apertures 32 and 34 are provided with apertures which can accommodate only a single conductor or conductor pair as the case may be. Alternate rows of apertures 33 and 35 are slotted to permit displacement of the conductor or conductor pairs in the slot as the face plate is oscillated.

Whether or not a given aperture 32 and 34 or a given slot 33 or 35 accommodates a single conductor or a conductor pair depends on the type of cable which is to be manufactured. For purposes of disclosure, the apertures 32 are shown as receiving a single conductor 36 while the apertures 34 receive a twisted conductor pair 37. Each of the slots 33 and 35 are shown with a twisted conductor pair 38 and 39, respectively. The apertures 40 are provided solely for mounting the face plate 15 to the sprockets 14 by receiving the pins 16.

Considering FIG. 2 as the starting position, conductor pairs 38 and 39 are at the right-hand end of the slots 33 and 35. As the face plate 15 is rotated in a clockwise direction, the conductor pairs 38 and 39 will slide in the slots 33 and 35 and will not be displaced with the face plate 15. Conductor pairs 37 and conductors 36 will, however, be displaced with the face plate as the face plate is rotated.

As shown in FIG. 3, upon further rotation of the face plate 15, the conductor pairs 38 will reach the left-hand end of the slots 33. Thus, upon still further rotation of the face plate 15, the conductor pairs 38 are also displaced with the face plate.

As the face plate 15 continues to rotate, it eventually reaches the position shown in FIG. 4; and the conductor pairs 39 reach the left-hand end of the slots 35. Thus, further rotation of the face plate will also displace the conductor pairs 39.

When the rotation of the face plate 15 is reversed, the same sequence will occur, only in the opposite direction. Thus, by oscillating the face plate 15, the positions of the conductors and conductor pairs relative to each other in the cable will continuously change along the length of the cable. By varying the length of the slots, the period of oscillation of the face plate and the speed at which the cable is advanced through the strander, the amount of change per unit length of cable can be controlled as desired.

The face plate of the instant invention may be utilized in any cable strander which utilizes a face plate and any conventional facility may be used to oscillate the face plate through the desired number of degrees. It has been found desirable to oscillate the face plate through approximately 360°. For the purposes of this disclosure and the claims, a strand will be understood to consist of either a single conductor or a twisted conductor pair.

It is to be understood that the above-described arrangements are simply illustrative of the application of the principles of this invention. Numerous other arrangements may be readily devised by those skilled in the art which will employ the principles of the invention and fall within the spirit and scope thereof.

What is claimed is:

1. An oscillatory face plate having a plurality of concentric rows of spaced apertures each of which receives a strand, alternate rows of such apertures having each aperture elongated to form an arcuate slot so that upon oscillation of the face plate the strands extending through the arcuate slots are displaced with the face plate only when one of the ends of the arcuate slots strikes its respective strand, the remaining rows of spaced apertures having circular apertures so that upon oscillation of the face plate the strands extending through the circular apertures are displaced with the face plate, whereby the position of the strands extending through the arcuate slots is varied along the length of the cable relative to the position of the strands extending through the circular slots.

2. A face plate for changing the position of selected conductors relative to each other along the length of a cable, comprising:
a plate having a plurality of concentric circular rows of spaced apertures, alternate rows of such apertures having each aperture elongated into an arcuate slot and the other rows of such apertures having circular apertures, a strand extending through each of the arcuate slots, each strand being displaced with the face plate upon oscillation of the face plate only when one of the ends of the arcuate slots strikes its respective strand, and a strand extending through each of the circular apertures, each strand being displaced with the face plate upon oscillation of the face plate so that the position of the strands extending through the arcuate slots changes relative to the position of the strands extending through the circular apertures as the face plate oscillates due to the freedom of movement permitted to the strands extending through the arcuate slots relative to the strands extending through the circular apertures.

3. A device for changing the position of selected conductors relative to each other along the length of a cable, comprising:
a face plate having a strand extending through each aperture in a plurality of concentric rows of spaced apertures in the face plate, alternate rows of such apertures having each aperture elongated to form an arcuate slot and the other rows of such apertures having circular apertures, and
means for oscillating the face plate, the strands extending through the circular apertures of the face plate being displaced upon oscillation of the face plate with the face plate while the strands extending through the arcuate slots of the face plate being displaced with the face plate only when one of the ends of the arcuate slots strikes its respective strand so that the position of the strands extending through the arcuate slots changes relative to the position of the strands extending through the circular apertures along the length of the cable due to the freedom of movement permitted to the strands extending through the arcuate slots relative to the strands extending through the circular apertures.

4. In a cable strander,
a face plate having a plurality of circular, equally spaced apertures arranged in concentric patterns about the center of said plate for receiving in each of said apertures a conductor, and having equally spaced arcuate slots for receiving in each of said slots a conductor and being arranged in concentric patterns located between the concentric patterns of said apertures, and
means for oscillating said face plate to twist the strands into a cable and to simultaneously change the relative positions of the strands in the slots along the length of the cable.

References Cited by the Examiner

UNITED STATES PATENTS

| | | | |
|---|---|---|---|
| 2,412,196 | 12/1946 | Ashbaugh et al. | 57—138 X |
| 2,530,726 | 11/1950 | Rasmussen | 57—166 X |
| 2,882,676 | 4/1959 | Bryan et al. | 57—138 |
| 3,133,402 | 5/1964 | Zwolinski et al. | 57—34 |
| 3,187,495 | 6/1965 | Cristian | 57—34 |

MERVIN STEIN, *Primary Examiner.*

D. E. WATKINS, *Assistant Examiner.*